(12) United States Patent
Nielsen et al.

(10) Patent No.: US 10,185,580 B2
(45) Date of Patent: Jan. 22, 2019

(54) INFORMATION MANAGEMENT

(75) Inventors: Bo Hjort Nielsen, Jamaica Plain, MA (US); D. Mark Judd, Acton, MA (US); Kirk Chu-Hsi Chao, Cambridge, MA (US)

(73) Assignee: INIT, LLC, Lexington, MA (US)

( * ) Notice: Subject to any disclaimer, the term of this patent is extended or adjusted under 35 U.S.C. 154(b) by 733 days.

(21) Appl. No.: 12/687,716

(22) Filed: Jan. 14, 2010

(65) Prior Publication Data

US 2011/0173546 A1    Jul. 14, 2011

(51) Int. Cl.
*G06F 3/01* (2006.01)
*G06F 3/048* (2013.01)
*G06F 9/451* (2018.01)

(52) U.S. Cl.
CPC .................. *G06F 9/451* (2018.02)

(58) Field of Classification Search
CPC .................. G06F 3/01; G06F 3/048
USPC .................. 715/866, 745, 853
See application file for complete search history.

(56) References Cited

U.S. PATENT DOCUMENTS

| | | | |
|---|---|---|---|
| 5,898,434 A | 4/1999 | Small et al. | |
| 6,233,571 B1 | 5/2001 | Egger et al. | |
| 6,647,396 B2 | 11/2003 | Parnell et al. | |
| 6,760,047 B2 | 7/2004 | Hough et al. | |
| 7,054,878 B2* | 5/2006 | Gottsman et al. | |
| 7,802,207 B2* | 9/2010 | Agboatwalla et al. | 715/866 |
| 2003/0120599 A1* | 6/2003 | Agboatwalla et al. | 705/50 |
| 2006/0242564 A1 | 10/2006 | Egger et al. | |
| 2007/0033517 A1* | 2/2007 | O'Shaughnessy et al. | 715/501.1 |
| 2007/0073704 A1* | 3/2007 | Bowden | G06F 17/30867 |
| 2007/0282890 A1 | 12/2007 | Kashiwagi et al. | |
| 2008/0249984 A1* | 10/2008 | Coimbatore | G06F 17/30864 |
| 2008/0263462 A1 | 10/2008 | Mayer-Ullmann et al. | |
| 2010/0211872 A1* | 8/2010 | Rolston | G06F 3/0482 |
| | | | 715/702 |

FOREIGN PATENT DOCUMENTS

| | | |
|---|---|---|
| CN | 1462404 | 12/2003 |
| CN | 101369381 | 2/2009 |

(Continued)

OTHER PUBLICATIONS

International Search Report for PCT/US2010/061583, dated Apr. 7, 2011.

(Continued)

*Primary Examiner* — Tadesse Hailu
*Assistant Examiner* — Darrin Hope
(74) *Attorney, Agent, or Firm* — Occhiutti & Rohlicek LLP

(57) ABSTRACT

An approach to managing information makes use of a multi-program graphical user environment (e.g., a virtual desktop). The graphical environment includes a first part in which information elements are presented to a user. A user selection of one or more information elements is accepted and corresponding representations of those elements are formed in another part of the graphical environment. The representations formed in the other part of the graphical environment are persistent as further information elements are presented to the user in the first part of the environment. In some examples, information elements may be classified by users such that application of and access to classifications is mediated a privilege system.

41 Claims, 5 Drawing Sheets

(56) References Cited

FOREIGN PATENT DOCUMENTS

| | | |
|---|---|---|
| CN | 101377787 | 3/2009 |
| JP | 2001-142827 | 5/2001 |
| JP | 2005-300605 | 10/2005 |

OTHER PUBLICATIONS

Heymann, Paul, et al. "Collaborative Creation of Communal Hierarchical Taxonomies in Social Tagging Systems" *InfoLab Technical Report* (2006) 5 pages.
Heymann, Paul "Tag Hierarchies" http://heymann.stanford.edu/taghierarchy.html (accessed Jul. 30, 2008) 3 pages.
Rivadeneria, A.W., et al. "Getting Our Head in the Clouds: Toward Evaluation Studies of Tagclouds" *CHI 2007 Proceedings—Tags, Tagging & Notetaking* (Apr. 28-May 3, 2007) San Jose, CA. pp. 995-998.
Schwarzkopf, Eric, et al. "Mining the Structure of Tag Spaces for User Modeling" *German Research Center for AI (DFKI)* (2006) 13 pages.
Dubinko, Micah, et al. "Visualizing Tags over Time" *ACM Transactions on the Web*, vol. 1, No. 2, article 7 (Aug. 2007) 21 pages.
Ajita, John, et al. "Collaborative Tagging and Expertise in the Enterprise" *Avaya Labs Resarch* (May 2006) 6 pages.
Office Action for Japanese Application No. 2012-548947, dated Nov. 11, 2014, (_pages).

\* cited by examiner

INFORMATION MANAGEMENT

BACKGROUND

This document relates to computer-implemented management of information.

Various information interfaces are available today for accessing information accessible on local or wide area networks. Search engines, such as Google or Yahoo, provide a way for users to search for information using keyword based queries. Some information sources, including online encyclopedias such as Wikipedia, provide dedicated search interfaces. Similar interfaces are available for local information, for example, using locally executing applications such as Microsoft SharePoint and locally hosted Wiki servers. In addition to search-based access to information, users can subscribe to information feeds in which they may be interested and interface applications ("readers") provide a way for users to view the information their receive. There is a need for users to manage information such as search results and information feeds in an effective manner.

SUMMARY

In one aspect, in general, an approach to managing information makes use of a multi-program graphical user environment (e.g., a virtual desktop). The graphical environment includes a first part in which information elements are presented to a user. A user selection of one or more information elements is accepted and corresponding representations of those elements are formed in another part of the graphical environment. The representations formed in the other part of the graphical environment are persistent, even if further information elements are presented to the user in the first part of the environment.

Aspects can include one or more of the following features.

A specification is accepted for the information elements for presenting to the user.

The information elements are assembled from a number of information sources according to the accepted specification.

Forming the corresponding representations of the selected information elements includes forming graphical elements corresponding to said information elements.

User inputs are accepted for manipulating the formed graphical elements.

The method further includes accepting user input for assembling multiple of the information elements represented in the other part of the graphical environment into an aggregated representation.

The aggregated representation is stored for later retrieval. The aggregated representation may be transmitted to another user.

The multi-program graphical user environment includes a virtual desktop environment.

An association of information elements and corresponding classifications is maintained.

Accepting the selection of the one or more information elements includes accepting a specification according to the classifications associated with the information elements.

An association of a place with an information element is set according to an input from the user.

Privilege information associated with the places is maintained, and setting the association of the place with the information element includes determining whether the user has privilege to set the place association.

In another aspect, in general, a method for information management includes maintaining a number of information elements, a number of information places, and a number of user groups. Privileges associated with the information places are maintained such that the privileges associated with each of at least some of the places include a privilege for a user group to apply the place to an information element, and a privilege for a user group to determine whether the place has been applied to the information element. Places are applied to the information elements. Applying the places includes restricting application of the places by users of the user groups according to the maintained privileges. Information elements are accessed for users according to places applied to the information elements. This access includes restricting use of places applied to the information elements according to the maintained privileges.

The information places are maintained in a hierarchical arrangement.

Accessing information elements for users according to places applied to the information elements includes accessing the information elements according to the hierarchical arrangement of the places.

In another aspect, in general, software is embodied on computer readable media and includes instructions for causing a data processing system to perform all the steps of any of the methods specified above.

In another aspect, in general, an information management system includes a graphical user interface. An information management component implements all the steps of any of the methods specified above.

Aspects may have one or more of the following advantages:

Providing a way for a user to save individual items of information, for example, individual search results or individual news items, allows the user to conduct a series of searches or other information retrieval operations without losing the saved items.

Using the desktop as a place to save items, for example, somewhat like electronic "sticky" notes, allows for unstructured saving of retrieved information in a compact form while still allowing access to the full information associated with those items.

Providing a way for the user to aggregate saved items allows the user to impose an aspect of organization on the saved results, for example, so that the aggregated results can be saved for later retrieval, transmitted to another user, or published to a community of users.

Providing an information interface that accesses multiple sources of information relieves the need for the user to make separate searches for the different sources. Graphically indicating the source of information items allows the user to treat different retrieved items according to their source. Graphical indicators, such as color, provide effective indicators that can allow the user to organize information without having to read or extract detailed information from each item.

Providing a privilege system for application of places to information elements and access to applied places enables flexible use of element classifications with desired levels of control.

Use of hierarchical arrangements of places simplifies administration of place-related privileges through inheritance approaches. The hierarchical arrangement can also provide a way for users to specify desired information elements with a desired degree of specificity.

Other features and advantages of the invention are apparent from the following description, and from the claims.

DESCRIPTION

Figure 1:
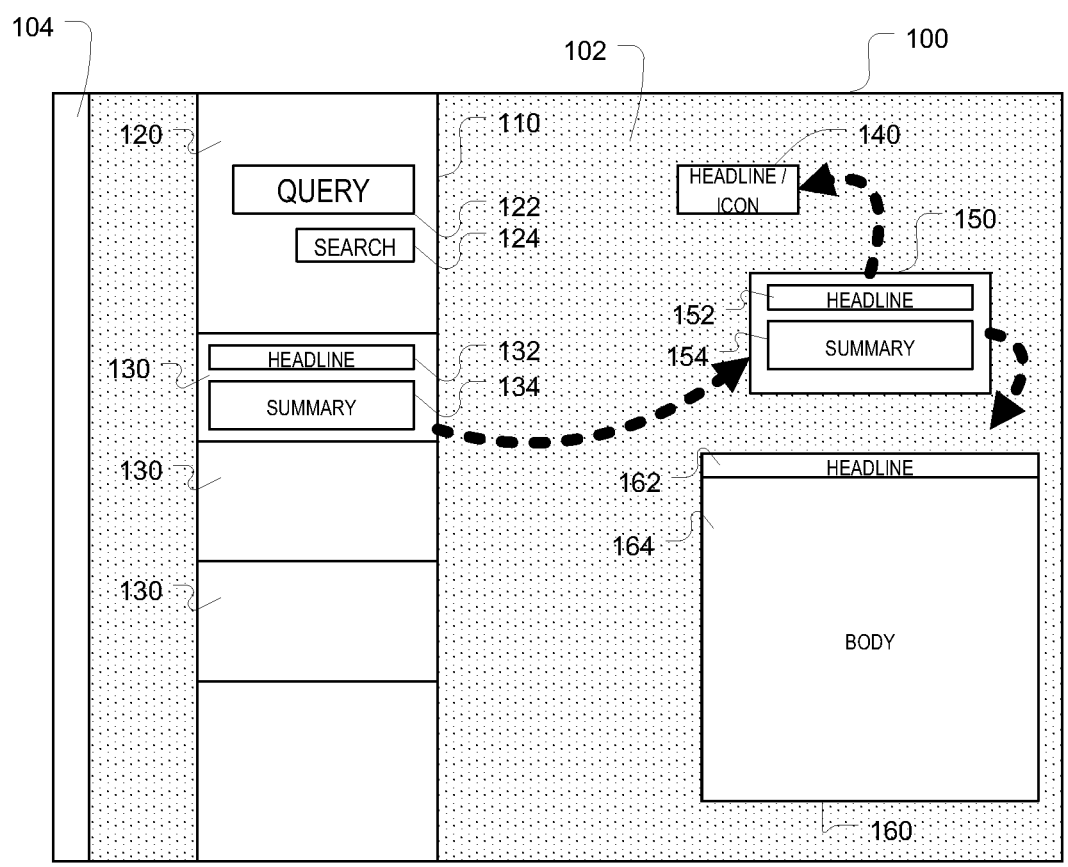
FIG. 1 is a schematic diagram of a graphical user environment.

Referring to FIG. 1, a graphical user environment 100, such as a window-based graphical interface ("desktop") provided as part of a Microsoft Windows™ operating system or a Mac OS™ operating system, provides a graphical environment in which a user has access to interfaces to various software applications (e.g., programs), typically with separate windows being controlled by different applications. In FIG. 1, such application windows are not illustrated and only a background 102 is shown, but the reader should understand that other windows, which may not be involved in the aspects of the user interface described below, can coexist with windows and icons discussed below.

In some embodiments, the graphical interface features an information bar 110, which provides an interface to the user for accessing and managing information that comes from one source, or more generally, from a variety of sources. Examples of ways in which a user accesses information is as search results and as subscriptions to various places of information. One aspect of managing information is that the user can "tear off" displayed items from the information bar and manipulate them as separate graphical elements, for example, that can be independently positioned on the graphical user environment 100.

In some embodiments, the information bar 110 has a reduced form 104 when not in use, shown as a collapsed bar. That is, the user can select a reduced form 104 and expand it to the full information bar 110 when needed, for example, using a mouse and control buttons on the display. Note that in some embodiments, the graphical nature of the reduced form 104 is not necessarily a bar on a side or top or bottom edge of the graphical display, and other forms of reduced forms, such as icons, characters or symbols represented on the display, or totally hidden (i.e., invisible) reduced forms, may also be used. Note also that in other embodiments, the information bar 110 is not necessarily a vertical bar as illustrated in FIG. 1. For example, the information bar may be a horizontal bar, a non-rectangular anchored shape, a floating window, a background element, etc. In some embodiments, the information bar is in a fixed location, while in some embodiments the user can slide the bar across the screen and/or position or resize it as desired or useful to not obscure other windows or information shown on the background.

The information bar 110 provides an interface through which the user accesses information from one or more sources. For example, the information bar is configured to provide access to one or more of:

an Internet search using a public search engine such as Google;
a particular Internet site such as an Internet-based encyclopedia (e.g., Wikipedia);
local information (e.g., files, directories, databases) on an Intranet generated using a local search engine such as Microsoft Sharepoint;
specific local information, for example, information maintained in a local Wiki server or using an application such as Lotus Notes;
local file-based search results using a local search application such as Google Desktop; and
subscriptions to information feeds, for example, provided in RSS (Really Simple Syndication) format or in the Atom Syndication Format.

In some embodiments, the selection of sources of information is user-selectable from a preconfigured set of options. In some embodiments, customized additions to the set of sources can be configured, for example, by loading "plug-in" modules.

In some examples, the information bar 110 provides a means for the user to specify specific information that is to be presented on the information bar. For example, the information bar 110 may include a query region 120. In general, the query region 120 is used to accept input from a user that identifies or characterizes the information that the user is seeking. In some embodiments, the user inputs a query 122 in text form, for example, by typing a set of space-delimited keywords that are to be located in elements of information that the user desires. In some embodiments, other forms of queries may be used. Such forms include form-based queries in which desired values of particular fields are entered in corresponding boxes, queries using a Boolean query language, and natural-language queries. The query region can include a control for initiating a search, such as a button labeled SEARCH 124. In examples that enable subscriptions to information feeds, the information bar can include elements for entry of addresses (e.g., URLs, Uniform Resource Locators) for the feeds (not illustrated).

Items of information are presented to the user on the information bar 110. For example, after a search is conducted based on the user's query, a set of results are shown to the user. In some embodiments, a number of result sections 130 are formed in the information bar 110. For example, each result has a separate result section 130, and each result section has a headline 132, which may be a title of the element of information that has been located, and has a summary 134, which provides more detail about the element of information.

In some examples, an aspect of the information bar 110 is that the user can place a representation 150 of a result section 130 elsewhere on the graphical user environment 100. In some examples, the user can separate a result section 130 from the information bar and place it, or a copy of it, elsewhere on the interface, for example, by selecting it and dragging it across the display (i.e., "tearing off" the result) using a pointing device, such as a mouse. In some examples, the result representation 150 is a window that has the same appearance as the original result section 130 that was present on the information bar 110, for example, having a headline 152 and a summary 154 that are the same as the headline 132 and summary 134 from the result section 130. In some examples, the user can further manipulate the display by moving the result representation 150 around the display or perform modifications of the representation, such as resizing the representation or changing its border color.

In some examples, the user has the option of changing the form of the result representation 150. For example, a user can reduce the detail and size of a representation of a result, for example, transforming the result into a graphical representation 140 that includes only a headline or has the form of an icon or a result-dependent image. An example of an icon or result-dependent image may be an image of a person when the result represents information retrieved in a search of a particular individual. In some examples, a result may be reduced in detail and size and located in a section of the display, such as a dock or bar for minimized windows, and in some examples, the reduced result may be located as a movable element on the graphical display.

In general, the user has the option to access the information associated with a result representation 150 by interacting with the result representation 150, or equivalently by interacting with the reduced representation 140 of the information. In some examples, such access is initiated by selecting the representation using a pointing device such as a mouse. For example, if the information represented is an Internet-based web page, the user may select the representation, causing a content window 160 to render the information based on a markup data form retrieved over the Internet, for example, using the Hyper Text Markup Language (HTML). In some examples, the content window 160 is a window of an associated application, such as a web browser application. In some examples, the result representation 150 is replaced with the content window 160, while in other examples, the result representation 150 remains present on the display along with the content window 160. In some examples, the user can reduce a full content window 160 back into a result representation window.

Figure 2:
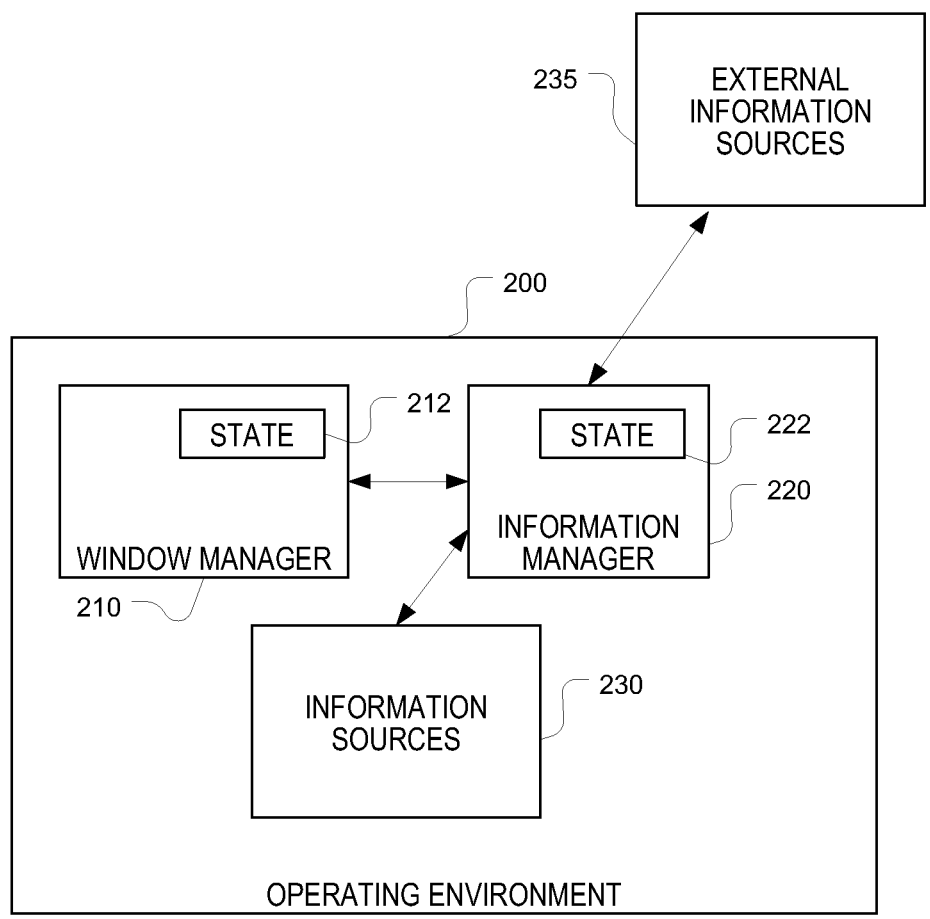
FIG. 2 is a logical block diagram of a software system.

Referring to FIG. 2, in some embodiments, the information bar and its related functionality is provided by an information manager process 220 that is hosted in an operating environment 200, for example, under the control of the Microsoft Windows XP™ operating system. The operating environment also includes a graphical user interface (GUI) manager 210, which implements services to interact with the user through the graphical interface, for example, by positioning windows and accepting inputs from the user. For example, the GUI manager may be built into the underlying operating system, or provided as a separate software application that is hosted by the operating system. In general, the information manager 220 makes use of services provided by the GUI manager 210. Other software applications hosted in the operating environment also make use of the GUI manager. In some examples, the information bar and its associated functions make use of graphical services implemented using an Adobe Flash™ environment.

The information manager 220 makes use of one or more local information sources 230 and/or external information sources 235. As introduced above, examples of such sources include local searchable data or servers, while external information sources include Internet-based search engines.

In general, the GUI manager 210 maintains a state 212, which is based on the interaction with the user. Such state may include sizes and positions of graphical elements such as windows, and the associations of those graphical elements with software processes responsible for those elements. In particular, the state 212 includes an association of graphical elements associated with the information bar 110 and related information elements with the information manager 220. In general, the information manager 220 includes state 222, which includes information such as the results of a recent query by the user, and, for graphical elements such as representations 140 and 150, associations of elements with underlying items of information. In some examples, the state 222 is stored as a file in a file system hosted by the operating environment. In some examples, the state 222 of the information manager is persistent, for example, persisting from termination to restarting of the information manager process.

Figure 5:
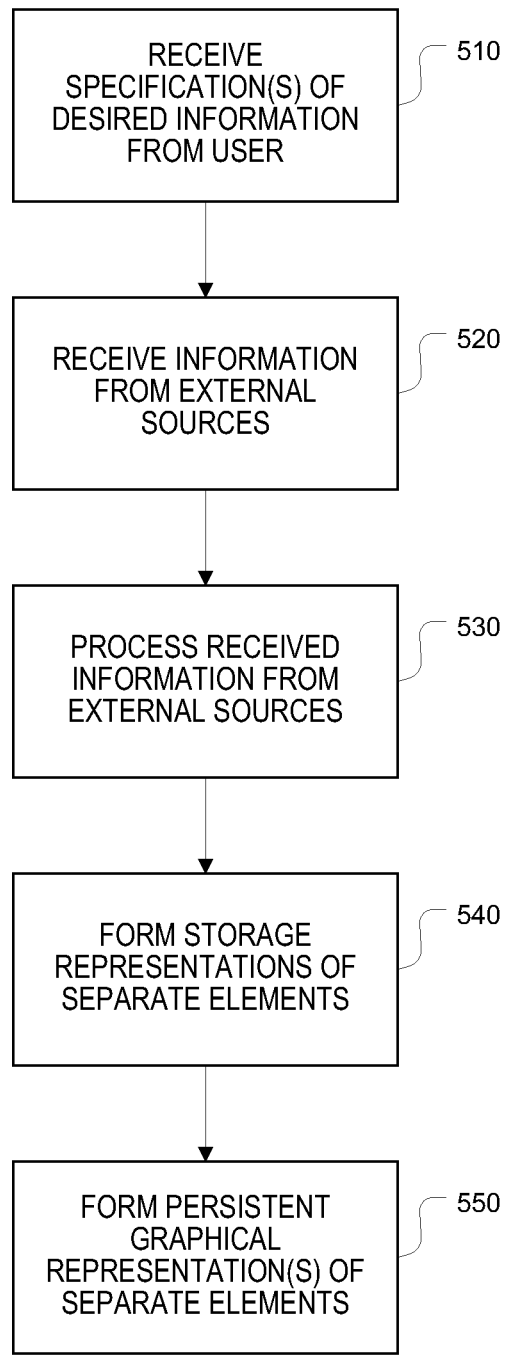
FIG. 5 is a flowchart for an information manager.

In general, referring to the flowchart of FIG. 5, in response to receiving a specification of desired information from the user (block 510), the information manager 220 identifies individual elements of information it receives from internal and external information sources 230 and 235, thereby allowing each item of information to be represented as a separate result section 130 (see FIG. 1) (block 520). Some information sources may not provide the information with individual information elements specifically identified, for example, being provided in a markup language such as HTML. In some such cases, the information manager 220 processes the received information to identify separate segments or elements (block 530), for example, by identifying specific markup elements (e.g., <div>) or patterns of markup elements that reflect the structure of the information. In some examples, the individual items of information are provided by the information sources in a format that represents the separate items of information, for example, being provided in an RSS feed in which each element is delimited (e.g., <item> . . . </item>) or in Atom format. The information manager then forms storage representations of the items (block 540), which it uses to form the persistent graphical representations of the separate elements (block 550).

Figure 3:
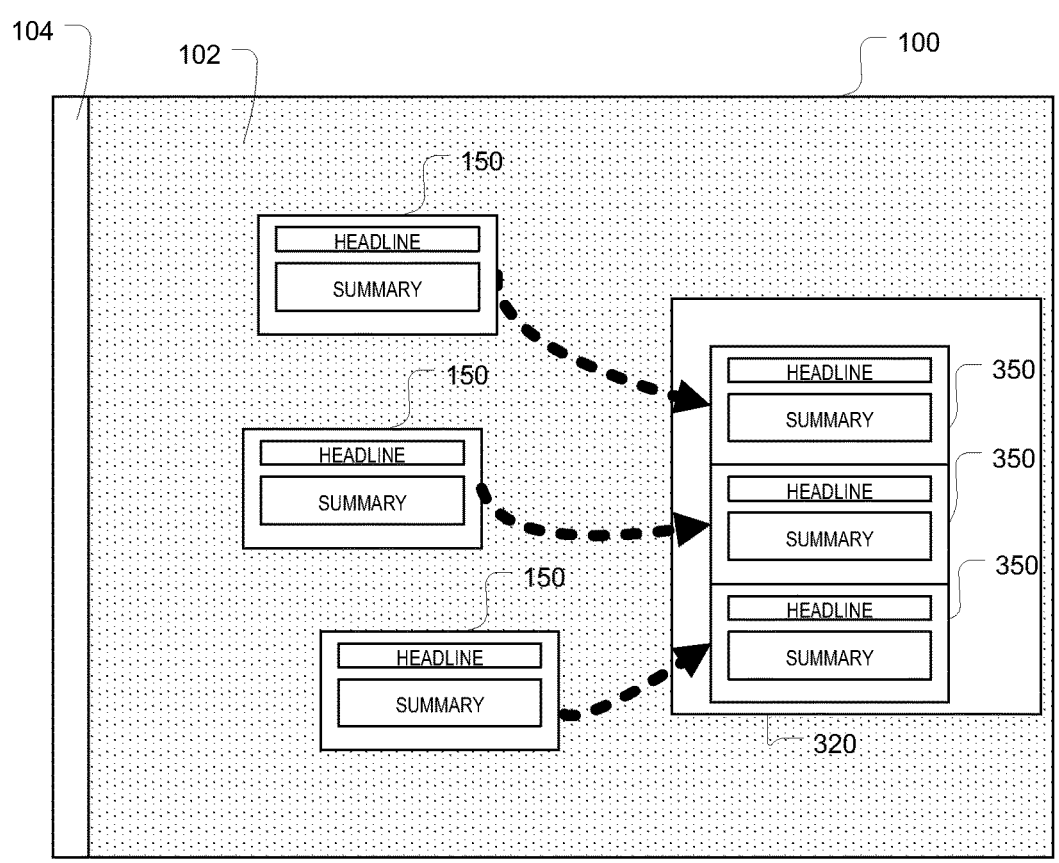
FIG. 3 is a schematic diagram of a graphical user interface.

Referring to FIG. 3, in addition to functionality described above with reference to FIG. 1, some embodiments provide additional functionality related to managing information elements. In an example illustrated in FIG. 3, representations 150 of three information elements are shown on the graphical user environment 100. For example, the user has previously "torn off" these elements as results from one or more searches conducted by the user, for example, over a span of time. The information manager 220 provides a way for the user to arrange multiple information elements into an aggregated representation 320. For example, the user may drag each of the representations 150 into the aggregated representation 320, and arrange them in an order desired by the user (e.g., the most important first). In some examples, the representations 150 are removed from the background, while in other examples copies of the representations 350 are formed in the aggregated representation 320. The aggregated representation 320 can be manipulated on the graphical interface by the user, for example, moving its window and changing the nature of the representation into a reduced (e.g., headline) or icon form. The user can access the individual elements of information in the aggregated representation 350, for example, to display more detailed information for the information element.

In some examples, the aggregated representation 350 may be manipulated in a number of additional ways. For example, an aggregated representation may be saved as a file on a file system in the operating environment. For example, the format may be specific to the information manager 220 such that the information manager is able to later reproduce the aggregated representation. In some examples, the representation may be saved in HTML format such that it can be rendered in a web browser application, and links in the saved document can be used later to access detailed information represented by the information elements. In some examples, the aggregated representation can be transmitted to other users, for example, as a directed electronic mail message, or published in a manner that other users can subscribe to the publication (e.g., as an RSS information feed).

In an example of use of the approach, a user investigates a topic of interest and conducts multiple searches over an extended period of time. As the user finds potentially interesting results, the user tears those results off and puts them on the desktop. As the user finds more interesting results, the user may move the results around the screen, delete results that are no longer of interest, and otherwise organize the result of the user's work. At times, the user may want to assemble (aggregate) some or all of the results that the user has placed on the user's desktop to save as a document for later retrieval. The user uses the information manager 220 to create an empty aggregated representation, drags the items of interest into the representation, and saves the aggregated representation as a document, in this example, an HTML document. The user may then, for example, email a copy of the document to a co-worker.

In another use case, the user subscribes to a number of information feeds, for example, being provided to the information manager as RSS information feeds. When the user sees an item of interest, the user adds that item to an aggregated representation. The user publishes the aggregated presentation such that they can be received by other users through their information managers.

Figure 4A:
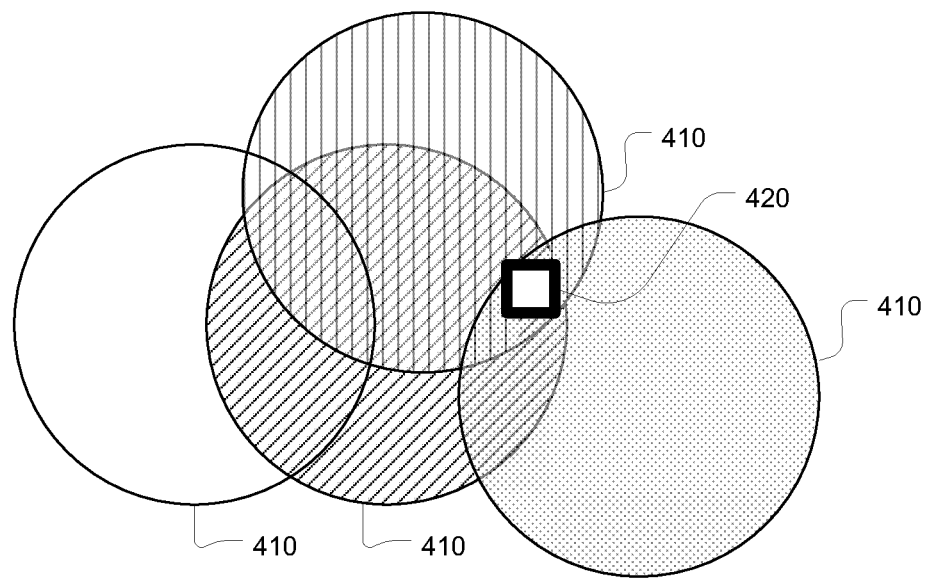
FIG. 4A is a diagram representing sources of information.
Figure 4B:
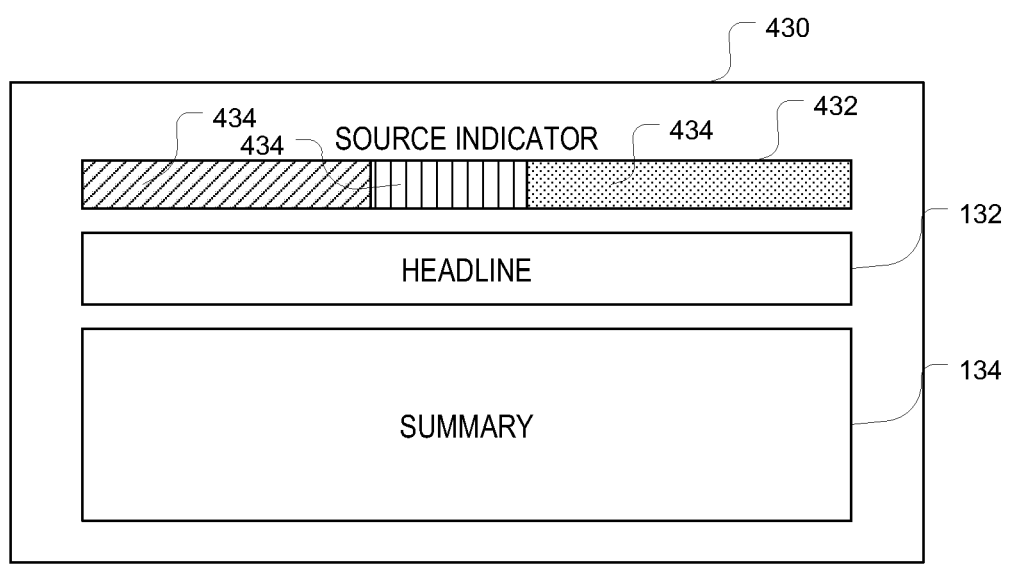
FIG. 4B is a schematic diagram of a graphical representation of an element of information.

Referring to FIGS. 4A and 4B, in some embodiments, the information manager can obtain information from a number of different sources (e.g., internal information, external web searches, wikis, etc.). A number of such information sources are represented schematically as regions 410 in FIG. 4A. The overlap between regions for different information sources represents the possibility that a particular information element 420 is a member of or available through more than one information source. Referring to FIG. 4B, when a user conducts a search or otherwise is presented with a set of result sections 430, each element and/or the set as a whole includes a source indicator 432 that presents in graphical form the source or sources of that element. For example, each source is associated with a different color, and the source(s) of the information element are represented by the color(s) of those sources. In some examples, an information element has different degrees of association with each of the information sources, and the graphical representation includes regions 434 that represent the degrees of association by their size or some other attribute or characteristic (e.g., as length in a bar graph representation). In some examples, the graphical source representation is maintained when the information is torn off the information bar, for example using a corresponding source indicator, or using graphics properties of the representations such as border color. In some examples, the information manager sorts and/or filters the result sections of the information bar in response to a user selection of a source indicator region 434 using a pointing device such as a mouse. In some examples, when a cursor hovers over a source indicator region 434, the information manager provides a brief description of the information source associated with the region 434. In some examples, the source indicator 432 presents in graphical form the place or places the element belongs to.

Information elements ("units") may be classified (e.g., "annotated", "tagged", "marked" etc.) to characterize their content. For example, as introduced above, information elements may have different sources, and the system may automatically annotate the elements from each source with a tag associated with that source. Users may then access information using queries and/or subscriptions that specify information at least in part according to the tag associated with the source. Similarly, when information elements are presented, the tags associated with those elements of information may be shown, for instance explicitly, or according to visual representations such as color associated with those tags. In some examples, the tags are applied by the system, for instance, when the information elements are accessed and brought into the system. In some examples, tags are manipulated by users (e.g., end users and administrative users) of the system.

One form of user manipulation of tags by the system involves a "collaborative" process by which some or all tags applied to an information element by a user are accessible by other users. As an example, a first user may annotate an information element as being related to a topic "finance", and other users may then be able to access (e.g., search for or subscribe to) the information element according to the "finance" tag. In some examples, tags must come from a prescribed list of tags, which may be administered by a privileged group of users, while in other examples, the tags may have relatively unrestricted form.

In some embodiments information elements are organized into an ordered logical space (or other form of ontology) such that each information element has a relative position or "place" in the ordered logical space. In such cases, an information element (such as an electronic document representing a webpage) is designated as a "place," where manipulations of a place within the ordered logical space (i.e., moving, applying and accessing) is controlled by a privilege system. In some examples, the privilege system makes use of an organization of users in a hierarchy (or other structured arrangement or specification) of groups of users.

Privilege for places is based on user groups, with each user by definition being a member of at least the one-member group including only that user. An information element is associated with privileges, for reading, writing/editing, and deleting, the element. For instance, if a user is not a member of a specified group of users that have reading privilege for an information element, that user cannot access that element and the element will not be provided to the user as a result of a search or a subscription. Similarly, a user cannot write/edit or delete an information element if that user is not a member of a group privileged to do so.

A place is also associated with privileges. A first privilege relates to associating an information element with that place, which is referred to as "applying" the place to the information element or "placing" the information element in the place. A second privilege relates to determining whether an information element has had a particular place applied to it, which is referred to as "seeing" that place. For example, in order to access information elements according to whether a particular place has been applied, that user must have the seeing privilege for that place.

As a simple example, an administration group of users may have the privilege to apply a "News" place to information elements, and the group of all users may have the privilege to see that "News" place. This permits any user to subscribe to "News" information elements if they choose to.

Places may include member places. For example, the "News" place may include a "Financial News" place and a "Sports News" place. The ability to add and remove member places is associated with "add" and "delete" privileges for a place. In some examples, each place has an owner group of users, and the add and delete privileges are restricted to users in that owner group. For example, if a user wishes to add a new place "Technology News" as a member of the "News" place, that user would have to have the add privilege for the "News" place.

In some examples, privileges are inherited by members of a group by default, and can be set by the owners of those members. For example, when a "Technology News" place is added to the "News" place, the "see" and "apply" privileges are inherited to be associated with the same group as the "News" group.

The set of associations of information elements (units) and places can therefore be represented according to a schema. That is, for information elements managed by the system, there is an associates "place_set" set of unit/place pairs, where each place in a pair may be at some intermediate point in a hierarchy of places.

As introduced above in the case of sources of information, places may be associated with attributes that affect their graphical depiction. For example, specific places or parts of the hierarchy of places (e.g., branches) may be associated with different colors, and when an information element is depicted, the color or colors of the places applied to that information element are depicted. In some examples, the depiction may also represent the number of places with each attribute such that if an information element is predominantly applied with places with one attribute, but is also applied with relatively fewer places with another attribute, the first attribute is depicted as "larger" or otherwise more important (e.g., brighter, in a more predominant/higher position, etc.).

In some embodiments, the application of a place to an information element is associated with a degree of association, such as a numeric weight. For example, a user applying a place to an information element may wish to mark that association as relatively weaker than other applications of that place. In some examples, these degrees of association are used in forming graphical depictions of the information elements, and may be used in selection or prioritization of elements, for example, resulting from place-based search queries or subscriptions.

The facilities described above for manipulating and accessing associations of places and information elements may be used for various forms of information managements. One example, relates to a workflow process. In this example, a "Company News" place is defined such that the group of all users can see when this place is applied to an information element, thereby allowing users to subscribe to the "Company News" place and/or search an archive of such elements. Users may also submit information for publication using the place mechanism, but an editorial workflow is used such that new information elements cannot have the "Company News" place applied to them without editorial review.

To restrict application of the "Company News" place to new articles, the "apply" privilege for that place is limited to an "Editors" user group. The "see" privilege, on the other hand, is associated with the group of all users, so that all users can subscribe to the group.

A second place, "Company News Submissions" is also defined in this example. This place has the "apply" privilege associated with all users, but the "see" privilege associated with only the "Editors" group. When a user wants to submit an information element for consideration by the editors, that user applies the "Company News Submission" place, and provides the Editors group with the privilege to modify the information element. Other users cannot in general see that the "Company News Submissions" place has been applied.

A user in the "Editors" group may subscribe to the "Company News Submissions" group, and determine that a particular submission should be passed through to the "Company News" place, possibly with some minor edits. After editing, the editor user removes the "Company News Submission" place and applies the "Company News" place to the information element. At this point, another user who has subscribed to the "Company News" place would be provided with that information element.

In some embodiments, a particular activity or workflow has a specific software application or interface that manipulates the underlying associations of places with information elements. The users (e.g., general users submitting articles, or editor users reviewing them) are thereby not required to be conscious of how access is controlled using the primitives described above.

Less managed forms of collaboration may also be used within the framework described above. For example, a "Commons" place may be defined with privilege set such that any user may be allowed to define a new place that is a member of the "Commons" place. Similarly, an "All Users" group of users may be defined such that any user may define a new subgroup. This permits a user to define a new place, for example, "Multiplayer Gaming" whose application to elements may be seen by all users. However, the user may wish to restrict application of that place so that only members of a particular software development group can apply it. So the user forms a "Gaming Developers" group of users, as a subset of the "All Users" group, and associates the "apply" privilege of "Multiplayer Gaming" to the "Gaming Developers" group.

In a less restrictive form of collaboration, a user may create a "Model Railroading" place with privilege set that anyone can apply (or remove) that place to an information element and form member places (e.g., "Antique Model Railroading").

In some embodiments, places (and users) are not necessarily restricted to form a strict hierarchy. For example, each place may be specified to be a member of one or more other places (parents), and may be specified to have some number of member places (children). In such embodiments, various specifications of privilege control whether a particular user group can change (e.g., add or delete) parent or child relationships for a place.

In some implementations a centralized database is used to hold the data associating places with information elements, and that database is used to process user queries and to route information to subscribing users. In some implementations, different portions of the space (e.g., tree) of places have data maintained in different locations, for example, at different computers or within different administrative domains. For example, a unified approach to specification of places may include a private component maintained within a company, as well as a public component maintained at a publicly accessible information provider. For example, the information provider may apply certain places to an information element, while users in a company may privately apply new or more specific places to those information elements without such applications being visible outside the company.

In some embodiments, elements also have privileges associated with groups of users. For example, read, edit, and delete privilege may be specified for an element independently of the privilege to apply places to that element. Furthermore, users may form aggregated groups of elements, and those aggregated groups may have privileges that are set independently of the component information elements.

Unless otherwise specified, the algorithms and procedures described above as parts of embodiments are not inherently related to any particular computer or other apparatus. In particular, various general purpose machines may be used with programs written in accordance with the teachings herein, or it may be more convenient to construct a specialized apparatus (e.g., integrated circuit) to perform particular functions. Thus, the approaches may be implemented in one or more computer programs executing on one or more programmable computer systems each comprising at least one processor, at least one data storage system (including volatile and non-volatile memory and/or storage elements), at least one input device or port, and at least one output device or port. Program code is applied to input data to perform the functions described herein and generate output information. The output information is applied to one or more output devices, in known fashion. Each such program may be implemented in any desired computer language (including machine, assembly, or high level procedural, logical, or object oriented programming languages) to communicate with a computer system. In any case, the language may be a compiled or interpreted language. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The embodiments may also be considered to be implemented as a computer-readable storage medium, configured with a computer program, where the storage medium so configured causes a computer system to operate in a specific and predefined manner to perform the functions described herein.

It is to be understood that the foregoing description is intended to illustrate and not to limit the scope of the invention, which is defined by the scope of the appended claims. Other embodiments are within the scope of the following claims.

What is claimed is:

1. A method for managing information in a multi-program graphical environment, the method comprising:
    presenting on a display a plurality of information elements in a first part of the graphical environment to a user;
    forming in the first part of the graphical environment a graphical source representation that indicates one or more information sources associated with respective ones of at least some of the information elements including indicating a total number of information sources associated with a particular information element of the plurality of information elements, with at least a first information element of the plurality of information elements being associated with a graphical source representation that indicates a plurality of information sources associated with the first information element;
    accepting selections of one or more information elements by the user;
    forming corresponding representations of the selected information elements in an other part of the graphical environment; and
    storing data in a data storage system to maintain as persistent the representations in the other part of the graphical environment as further information elements are presented in the first part of the graphical environment to the user.

2. The method of claim 1 further comprising accepting a specification for the plurality of information elements for presenting to the user.

3. The method of claim 2 further comprising assembling the plurality of information elements from the plurality of information sources according to the accepted specification.

4. The method of claim 1 wherein forming the corresponding representations of the selected information elements includes forming graphical elements corresponding to said information elements.

5. The method of claim 4 further comprising accepting user inputs for manipulating the formed graphical elements.

6. The method of claim 1 further comprising:
    accepting user input for assembling multiple of the information elements represented in the other part of the graphical environment into an aggregated representation.

7. The method of claim 6 further comprising storing the aggregated representation for later retrieval.

8. The method of claim 6 further comprising transmitting the aggregated representation to another user.

9. The method of claim 1, wherein the multi-program graphical environment comprises a virtual desktop environment.

10. The method of claim 1, maintaining an association of information elements and corresponding classifications.

11. The method of claim 10, wherein accepting the selection of the one or more information elements includes accepting a specification according to the classifications associated with the information elements.

12. The method of claim 10, further comprising:
    setting an association of a place with an information element according to an input from the user.

13. The method of claim 12, further comprising maintaining privilege information associated with the place, and setting the association of the place with the information element includes determining whether the user has privilege to set the place association.

14. The method of claim 1, wherein the graphical source representation includes associations between different information sources and different respective colors.

15. The method of claim 14, further comprising maintaining in the other part of the graphical environment an association between a first information source and one or more selected information elements including forming the corresponding representations of the one or more selected information elements with a border color matching the color associated with the first information source.

16. The method of claim 1, wherein the graphical source representation represents a degree of association between an information element and one or more sources.

17. The method of claim 1 wherein the plurality of information elements include at least some information elements that represent different results of a query associated with the first part of the graphical environment.

18. The method of claim 1 wherein maintaining as persistent the representations in the other part of the graphical environment as further information elements are presented in the first part of the graphical environment to the user includes persisting state associated with the representations of the selected information elements from termination to restarting of an information manager process that manages the graphical environment.

19. The method of claim 18 wherein state associated with the representations of the selected information elements comprises individual storage representations that correspond to individual graphical representations of different selected information elements.

20. The method of claim 1 wherein the plurality of information sources associated with the first information element include one or more of: an Internet site, an information feed, a file system location, a server location, or a software application.

21. The method of claim 1 wherein the first information element was included in respective results of queries of each of the plurality of information sources.

22. A method for information management comprising:
maintaining data in a data storage system representing a plurality of information elements;
maintaining data in the data storage system representing a plurality of information places;
maintaining data in the data storage system representing a plurality of user groups;
maintaining data in the data storage system representing privileges associated with the information places, the privileges associated with each of at least some of the places including
a privilege for a user group to apply the place to an information element, and
a privilege for a user group to determine whether the place has been applied to the information element;
applying places to the information elements by a privilege system of a computer system in communication with the data storage system, including restricting application of the places by users of the user groups according to the maintained privileges;
presenting on a display a plurality of information elements in a graphical environment to a user, including forming in the graphical environment a graphical place representation that indicates one or more of the places applied to respective ones of at least some of the information elements including indicating a total number of places applied to a particular information element of the plurality of information elements, with at least a first information element of the plurality of information elements being associated with a graphical place representation that indicates a plurality of places applied to the first information element;
receiving selections of one or more information elements based at least in part on user interaction with the graphical place representation; and
accessing information elements selected by one or more users according to places applied to the information elements, including restricting use of places applied to the information elements according to the maintained privileges.

23. The method of claim 22, wherein maintaining the plurality of information places includes maintaining a hierarchical arrangement of information places.

24. The method of claim 23, wherein accessing information elements selected by one or more users according to places applied to the information elements includes accessing the information elements according to the hierarchical arrangement of the places.

25. The method of claim 14, wherein the graphical place representation includes associations between different places and different respective colors.

26. The method of claim 14, wherein the graphical place representation represents a degree of association between an information element and one or more places.

27. A non-transitory computer-readable medium comprising instructions for causing a data processing system to:
present a plurality of information elements in a first part of a graphical environment to a user;
form in the first part of the graphical environment a graphical source representation that indicates one or more information sources associated with respective ones of at least some of the information elements including indicating a total number of information sources associated with a particular information element of the plurality of information elements, with at least a first information element of the plurality of information elements being associated with a graphical source representation that indicates a plurality of information sources associated with the first information element;
accept selections of one or more information elements by the user;
form corresponding representations of the selected information elements in an other part of the graphical environment; and
maintain as persistent the representations in the other part of the graphical environment as further information elements are presented in the first part of the graphical environment to the user.

28. The non-transitory computer-readable medium of claim 27 wherein the instructions further causes the system to accept a specification for the plurality of information elements for presenting to the user.

29. The non-transitory computer-readable medium of claim 28 wherein the instructions further causes the system to assemble the plurality of information elements from the plurality of information sources according to the accepted specification.

30. The non-transitory computer-readable medium of claim 27 wherein forming the corresponding representations of the selected information elements includes forming graphical elements corresponding to said information elements.

31. The non-transitory computer-readable medium of claim 30 wherein the instructions further causes the system to accept user inputs for manipulating the formed graphical elements.

32. The non-transitory computer-readable medium of claim 27 wherein the instructions further causes the system to:
accept user input for assembling multiple of the information elements represented in the other part of the graphical environment into an aggregated representation.

33. The non-transitory computer-readable medium of claim 27, wherein the graphical source representation includes associations between different information sources and different respective colors.

34. The non-transitory computer-readable medium of claim 33, further comprising maintaining in the other part of the graphical environment an association between a first information source and one or more selected information elements including forming the corresponding representations of the one or more selected information elements with a border color matching the color associated with the first information source.

35. The non-transitory computer-readable medium of claim 27, wherein the graphical source representation represents a degree of association between an information element and one or more sources.

36. A method for information management comprising:
maintaining data in a data storage system representing a plurality of information elements;
maintaining data in the data storage system representing a plurality of information places;
maintaining data in the data storage system representing privileges associated with the information places;
applying information places to the information elements by a privilege system of a computer system in communication with the data storage system, including restricting application of the information places according to the maintained privileges;

presenting on a display a plurality of information elements in a first part of a graphical environment to a user, including forming in the graphical environment at least one graphical source indicator that indicates: a plurality of information sources associated with a particular information element of the plurality of information elements, or a plurality of information places applied to the particular information element, or at least one source associated with the particular information element and at least one place applied to the particular information element.

37. The method of claim 36, wherein the graphical source indicator includes multiple regions, and the number of regions indicate: a plurality of information sources associated with an information element, or a plurality of information places applied to an information element, or at least one source associated with an information element and at least one place applied to the information element.

38. The method of claim 36, further comprising:
receiving selections of one or more information elements based at least in part on user interaction with the graphical source indicator; and
accessing information elements selected by one or more users according to information places applied to the information elements, including restricting use of information places applied to the information elements according to the maintained privileges.

39. The method of claim 36, further comprising:
receiving selections of one or more information elements;
forming corresponding representations of the selected information elements in an other part of the graphical environment, and maintaining in the other part of the graphical environment the graphical source indicator in association with one or more selected information elements; and
storing data in a data storage system to maintain as persistent the representations in the other part of the graphical environment as further information elements are presented in the first part of the graphical environment to the user.

40. A computer system, comprising:
a display;
at least one processor configured to manage information in a graphical environment presented on the display, the managing including
presenting on the display a plurality of information elements in a first part of the graphical environment to a user;
forming in the first part of the graphical environment a graphical source representation that indicates one or more information sources associated with respective ones of at least some of the information elements including indicating a total number of information sources associated with a particular information element of the plurality of information elements, with at least a first information element of the plurality of information elements being associated with a graphical source representation that indicates a plurality of information sources associated with the first information element;
accepting selections of one or more information elements by the user;
forming corresponding representations of the selected information elements in an other part of the graphical environment; and
storing data in a data storage system to maintain as persistent the representations in the other part of the graphical environment as further information elements are presented in the first part of the graphical environment to the user.

41. A computer system, comprising:
means for displaying a graphical environment;
means for managing information in the graphical environment, the managing including
presenting a plurality of information elements in a first part of the graphical environment to a user;
forming in the first part of the graphical environment a graphical source representation that indicates one or more information sources associated with respective ones of at least some of the information elements including indicating a total number of information sources associated with a particular information element of the plurality of information elements, with at least a first information element of the plurality of information elements being associated with a graphical source representation that indicates a plurality of information sources associated with the first information element;
accepting selections of one or more information elements by the user;
forming corresponding representations of the selected information elements in an other part of the graphical environment; and
storing data in a data storage system to maintain as persistent the representations in the other part of the graphical environment as further information elements are presented in the first part of the graphical environment to the user.

\* \* \* \* \*